United States Patent [19]

Kim

[11] 4,202,912
[45] May 13, 1980

[54] PROCESS FOR PRESERVING VEGETABLES USED TO MAKE KIMCHEE

[76] Inventor: Sunyong P. Kim, 535 N. Cahuenga Blvd., Los Angeles, Calif. 90004

[21] Appl. No.: 955,953

[22] Filed: Oct. 30, 1978

[51] Int. Cl.² ............................................. A23L 1/20
[52] U.S. Cl. ................................. 426/615; 426/270; 426/404; 426/506; 426/638
[58] Field of Search ............ 426/615, 638, 270, 404, 426/455, 506

[56] References Cited

U.S. PATENT DOCUMENTS

| | | | |
|---|---|---|---|
| 1,208,909 | 12/1916 | Burt et al. | 426/404 X |
| 1,387,710 | 8/1921 | Harrison | 426/470 |
| 2,322,880 | 6/1943 | Pollak | 426/615 X |

FOREIGN PATENT DOCUMENTS 45-37074 11/1970 Japan ..................................... 426/270

*Primary Examiner*—Robert L. Lindsay, Jr.
*Attorney, Agent, or Firm*—John T. Matlago

[57] ABSTRACT

A process is provided for preserving fresh vegetables such as cabbages and/or radishes used in making a Korean pickled food called kimchee. After being washed in water and cut-up into sizeable pieces, the vegetables are soaked in salt water, dried to remove any excess moisture, and then vacuum packaged. This enables the vegetables to be maintained without spoiling for a period of two weeks or so without refrigeration. Associated with each vacuum package of vegetables is a package of a mixture of condiments as needed for seasoning the vegetables to obtain the desired pickled kimchee taste upon fermentation.

8 Claims, No Drawings

PROCESS FOR PRESERVING VEGETABLES USED TO MAKE KIMCHEE

BACKGROUND OF THE INVENTION

This invention generally relates to preserving food products and more particularly to a process for preserving vegetables for use in making a Korean national dish called kimchee.

Kimchee is a pickled food which Koreans are accustomed to eating at every meal all year round. The following vegetables and condiments are typically provided for making kimchee: chinese cabbages and/or long white radishes, and a seasoning mixture including, for example, onion, ginger, red pepper, garlic and recombole. Conventionally in order to prepare kimchee in Korea, several heads of freshly picked cabbages and/or roots of radishes are cut up into pieces and soaked in salt water for approximately one or two days. After a desired amount of the seasoning mixture has been added to the vegetables, the whole mass is put into a large jar of water and kept at a moderate temperature for approximately two or three days during which time the mass ferments or sours and starts to acquire the kimchee flavor so that the family can begin to eat it. If the mass of kimchee tends to ferment too fast, as indicated by the taste for example, then the jar in which it is held can be placed in a refrigerator and maintained at about 45 degrees F. to slow down the fermentation process. The madeup kimchee can be stored in this manner for a period of two to three weeks before a new batch need be prepared in readiness for eating.

Because kimchee once it is made up to ferment, is a bulky and odoriferous concoction, it is difficult to transport and store and has traditionally been much too costly to commercialize. This suggests that the vegetables and the condiments be kept separated and sold in that manner in a grocery store or other market so as to facilitate the making of kimchee at home by the purchaser when desired. It should be noted, however, that it has long been recognized that the vegetables such as the cabbages and/or radishes used to make kimchee should be processed as above described within one or two days after they are freshly picked in order to preserve their natural flavor. Thus the problem has been how to store these vegetables for longer periods of time such as two weeks or so without refrigeration so that a fresh supply of the vegetables need not have to be purchased and cut-up each time it is desired to prepare a new batch of kimchee.

DESCRIPTION OF PREFERRED PROCESS

In accordance with the process of the present invention, in order to preserve and store the vegetables needed to make kimchee they are cut up into sizeable pieces preferably within a day or two after they have been freshly picked. The pieces of cabbages and/or radishes are then thoroughly washed and soaked in salt water at room temperature for approximately fifteen to twenty minutes. Upon being taken from the salt water, the pieces of cabbages and/or radishes are dried of any excess moisture. A selected amount of the vegetables, as needed to make, for example, a one week supply of kimchee for a family of four, is then vacuum packaged in individual plastic film containers or bags and heat sealed. It should be noted that the vacuum packaging per se tends to further dry or dehydrate the pieces of cabbages and/or radishes.

It has been generally theorized that bacteria of the type naturally occurring in foodstuff such as vegetables are unable to thrive or reproduce under a vacuum condition. Accordingly, it is believed that the cabbages and/or radishes when vacuum packaged according to the present invention will be maintained in a substantially sterile condition, i.e., a condition comparable to foodstuffs which are stored at about 45 degrees F. refrigeration but, of course, without the need for such refrigeration.

In accordance with the present invention, accompanying the vacuum packaged vegetables are the condiments or seasoning needed to prepare the kimchee. Although the seasoning mixture is not limited to any particular combination of ingredients, a selected group which may be used is as follows: onion, ginger, red pepper, garlic and recombole. After preparing a large quantity of the seasoning mixture, a selected amount as needed for processing each vacuum packaged batch of the cabbages and/or radishes is then placed in a plastic film bag and preferably attached thereto. It should be noted that a certain mixture of these ingredients is important to provide a desired taste to the kimchee.

It should now be understood that by use of the present invention the vegetables and condiments needed to prepare kimchee, after being packaged as above described, can be supplied to grocery stores and may be maintained on the shelves thereof without refrigeration for a period of as much as two weeks without spoiling. If refrigeration is available, then the vacuum packaged vegetables may be stored at approximately 45 degrees F. for a period up to as much as a month or so without losing their natural flavor or otherwise spoiling.

It should now be clear that having purchased a vacuum package of vegetables and an accompanying package of condiments, to prepare kimchee in the home, an appropriate vessel such as a jar is filled with water. The condiments are then taken from the package and mixed therein. The vegetables are then removed from the vacuum package and placed in the jar and the mass is left to ferment at room temperature for approximately one day. The kimchee is then ready to eat. If it is not to be eaten within the next day or so it can be stored for as long as two three weeks by placing it in the refrigerator at approximately 45 degrees F.

It should now be appreciated that in the large metropolitan areas of the United States where there are established Korean communities, grocery stores or markets can be setup to enable the Korean people to readily purchase the vegetables and condiments packaged in accordance with the present invention so that they can prepare kimchee at home. However, the smaller cities and the outlying areas do not generally have Korean markets. So when the Korean residents of these outlying areas desire to purchase the packaged vegetables and condiments needed to prepare kimchee they must order them by mail from the markets in the larger metropolitan areas. Thus, the packaging process of the present invention makes it possible for Koreans in these outlying areas to obtain the foodstuff to make kimchee since the vacuum packaged vegetables can be preserved without the need for refrigeration for the period of time it takes for the mailing thereof to the outlying areas.

As will be understood by those skilled in the art, what has been described is a preferred process in which modifications and changes may be made without departing from the spirit and scope of the accompanying claims.

What is claimed in support of Letters Patent is:

1. A process for preserving vegetables such as cabbages and radishes needed to prepare kimchee, said process including the steps of:
   cutting up fresh vegetables into sizeable pieces;
   washing the pieces of vegetables with water;
   soaking the pieces of vegetables in salt water for a time period on the order of 15 to 20 minutes;
   drying the pieces of vegetables of any excess moisture; and
   vacuum packaging the pieces of vegetables.

2. A process for preserving foodstuffs needed to prepare kimchee as defined in caim 1 wherein said vegetables are chinese cabbages.

3. A process for preserving foodstuffs needed to prepare kimchee as defined in claim 1 wherein said vegetables are radishes.

4. A process for preserving foodstuffs needed to prepare kimchee as defined in claim 1 wherein said vegetables include cabbages and radishes.

5. A process for preserving fresh vegetables such as cabbages and radishes for use in preparing kimchee, said process including steps of:
   cutting up the fresh vegetables into sizeable pieces;
   washing the pieces of vegetables with water;
   soaking the pieces of vegetables in salt water for a time period on the order of 15 to 20 minutes;
   drying the pieces of vegetables of any excess moisture;
   vacuum packaging the pieces of vegetables;
   providing an additional package of condiments as needed for preparing the kimchee;
   attaching said additional package of condiments to the vacuum packaged vegetables; and
   mailing said vacuum packaged vegetables and said additional package of condiments without the need for refrigeration.

6. A process for preserving foodstuffs needed to prepare kimchee as defined in claim 1 including the step of providing an additional package of condiments as needed for preparing the kimchee.

7. A process for preserving foodstuffs needed to prepare kimchee as defined in claim 6 wherein said condiments include garlic, onion, ginger, red pepper and recombole.

8. A process for preserving foodstuffs needed to prepare kimchee as defined in claim 1 including the step of refrigerating said vacuum package of vegetables at approximately 45 degrees F.

* * * * *